United States Patent
Ni

(10) Patent No.: US 7,039,010 B2
(45) Date of Patent: May 2, 2006

(54) OPTIMIZED DATA PATH STRUCTURE FOR MULTI-CHANNEL MANAGEMENT INFORMATION BASE (MIB) EVENT GENERATION

(75) Inventor: Shih-Hsiung Ni, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 954 days.

(21) Appl. No.: 10/090,845

(22) Filed: Mar. 6, 2002

(65) Prior Publication Data

US 2003/0169686 A1   Sep. 11, 2003

(51) Int. Cl.
*G01R 31/08* (2006.01)

(52) U.S. Cl. .................. 370/229; 370/235; 709/223

(58) Field of Classification Search .................. None
See application file for complete search history.

(56) References Cited

U.S. PATENT DOCUMENTS

| | | | |
|---|---|---|---|
| 5,493,562 A * | 2/1996 | Lo | 370/252 |
| 5,781,549 A | 7/1998 | Dai | |
| 6,108,342 A | 8/2000 | Runaldue et al. | |
| 6,130,891 A | 10/2000 | Lam et al. | |
| 6,175,866 B1 * | 1/2001 | Holloway et al. | 709/223 |
| 6,176,883 B1 * | 1/2001 | Holloway et al. | 709/223 |
| 2003/0076832 A1 * | 4/2003 | Ni | 370/395.1 |
| 2003/0090716 A1 * | 5/2003 | Umebayashi | 358/1.15 |

FOREIGN PATENT DOCUMENTS

EP   854606   7/1998

* cited by examiner

*Primary Examiner*—Duc Ho
(74) *Attorney, Agent, or Firm*—Squire, Sanders & Dempsey L.L.P.

(57) ABSTRACT

The present invention provides for handling data flow within a network device, which includes a cycle timing module, a division module, an assignment module, and an input device. The cycle timing module is configured to determine the cycle time needed to process a set of incoming data. The division module is configured to divide a serial shifting bus into a plurality of segments, wherein the serial shifting bus is included within the network to transfer the data. The assignment module is configured to assign a plurality of assembly lines to each segment, wherein each of the assembly lines is connected to the serial shifting bus. The serial shifting bus serially shifting the data until the data reaches end of the bus segment. The end of the serial bus segment is configured to transfer the data out of the serial shifting bus to a management information base processing unit.

17 Claims, 4 Drawing Sheets

OPTIMIZED DATA PATH STRUCTURE FOR MULTI-CHANNEL MANAGEMENT INFORMATION BASE (MIB) EVENT GENERATION

BACKGROUND OF THE INVENTION

1. Field of the Invention

The invention relates to a method and apparatus for a network device that resolves routing congesting problems caused by concurrent MIB status reports received from multiple assembly lines in a channelized switch system.

2. Description of the Related Art

Network management is required to handle special activities of initialization, termination, and monitoring of activities of devices within a network. Typically, network management is viewed as a distributed application which interacts with other management processes in the network to track packet transmission events in order to provide a basis for statistical analysis of the network operation with respect to each data network switch port. The network-management system typically consists of a manager, which executes the managing process. For example, the number of transmitted packets, received packets, and transmission collisions can be counted and polled periodically. These significant parameters, termed objects, are collected in a MIB, which is a collection of managed objects. Namely, objects are variables that hold information about the state of some process running on a network device or that include textual information about the device, such as a name and description. The managed object provides a means to identify, control, and monitor a network device. An agent resides within the local device, collects information from the managed objects and provides that information to the MIB. In essence, agents monitor for significant events that occur within a device. Alarms provide alerts when predefined thresholds are exceeded. Alarms can alert an administrator when defined events occur on the network. Events provide a way to trigger actions based on alarms. Events are defined in MIB modules and are usually based on thresholds that have been exceeded, such as when traffic on a segment of the network has exceeded a particular level. The managed devices themselves are responsible for initiating the alarms, and an agent running on the device traps the event and sends a report to all management stations within the network.

Thus, the MIB specifies the different counters, status events, alarms, and notification to be reported for each managed device. The MIB may be different for different devices contained within the network. Through the use of statistical counters, a determination of an improperly functioning device can be made, such as a device that is generating a loss of data packets. The MIB counters contains all the per port statistic which are updated periodically by the network device.

Depending upon the network management protocol employed, the network management console must continually or periodically poll the agents to obtain information and store the information. A Simple Network Management Protocol (SNMP) is an example of a protocol that requires continual polling, and Remote Monitoring, (RMON) is an example of periodic polling. Nevertheless, the process of gathering this information not only increases network traffic. It also places a large burden on the network management console. In a channelized switch system, such as a SPI-4 (System Packet Interface Level 4) interface, generating MIB events becomes a nontrivial task. The problem occurs due to the fact that the SPI-4 interface is channelized. An unchannelized interface is a single port where all traffic is packet based, so that one packet has to finish being processed before the process for the next packet can begin. However, within a channelized network, multiple packets can be interleaved and transferred simultaneously, up to the maximum number of available channels. For this reason, separate assembly line logic may be needed for each channel to handle all the interleaved traffic being transmitted from the different channels. For example, in a 24-channel SPI-interface, twenty-four individual assembly logic are included to handle the assembly of the data packets as the data is received into the network. Therefore, each assembly line generates a sixty-one-bit wide MIB status event that needs to be processed by the MIB logic to increment the MIB counters. With twenty-four channels transmitting a total of one thousand four hundred sixty-four bit wide status entering into one central location for processing, this can cause tremendous amount of routing congestion. This situation can be further exacerbated because due to the inherent nature of some of today's systems, such as the SPI-4 interface, which are capable of generating, not just one MIB event, but at least two MIBs events which need to be processed simultaneously. Thus, an additional burden is placed on the central MIB processing unit since it is required to process two MIB event statuses with only one set of MIB counters. Although modifying the existing systems to include two sets of MIB logic to handle the two simultaneous status reporting events appears to be an instinctive, straightforward resolution to this problem. However, such a system would endure an unbearable routing congestion problem.

Therefore, a need exists to provide a data path structure for a multi-channel MIB processing unit that is capable of efficiently handling and processing the incoming status events.

SUMMARY OF THE INVENTION

The present invention is drawn to a method of handling data flow within a network. The method includes the steps of detecting a set of data entering the network, determining a cycle time needed to process the set of data, and dividing a serial shifting bus into a plurality of segments, wherein the serial shifting bus is included within the network to transfer the data. The method also includes the steps of assigning a plurality of assembly lines to each segment, wherein each of the assembly lines is connected to the serial shifting bus, transferring the data to the plurality of assembly lines for processing and assembly of the data, generating MIB status within each assembly line and latching the status to the serial bus, shifting the data from the assembly lines to the serial bus, and transferring the data out of the serial shifting bus to a management base processing unit.

The serial bus may be made of flip flops acting as storage elements. Furthermore, the data in the serial bus may be shifted to the right continuously until the data reaches the end of the serial bus, where the data will be transferring out of the shifting bus to a management information base processing unit.

In another embodiment the invention is drawn to a network device which includes a cycle timing module, a division module, an assignment module, and an input device. The cycle timing module is configured to determine the cycle time needed to process a set of incoming data. The division module is configured to divide a serial shifting bus into a plurality of segments, wherein the serial shifting bus is included within the network to transfer the data. The assignment module is configured to assign a plurality of assembly lines to each segment, wherein each of the assembly lines is connected to the serial shifting bus. The serial shifting bus serially shifting the data to until the data reaches the end of the serial bus. Then the data is transferred out of the serial shifting bus to a management information base processing unit.

BRIEF DESCRIPTION OF THE DRAWINGS

The objects and features of the invention will be more readily understood with reference to the following description and the attached drawings, wherein.

DETAILED DESCRIPTION OF THE PREFERRED EMBODIMENTS

Figure 1:
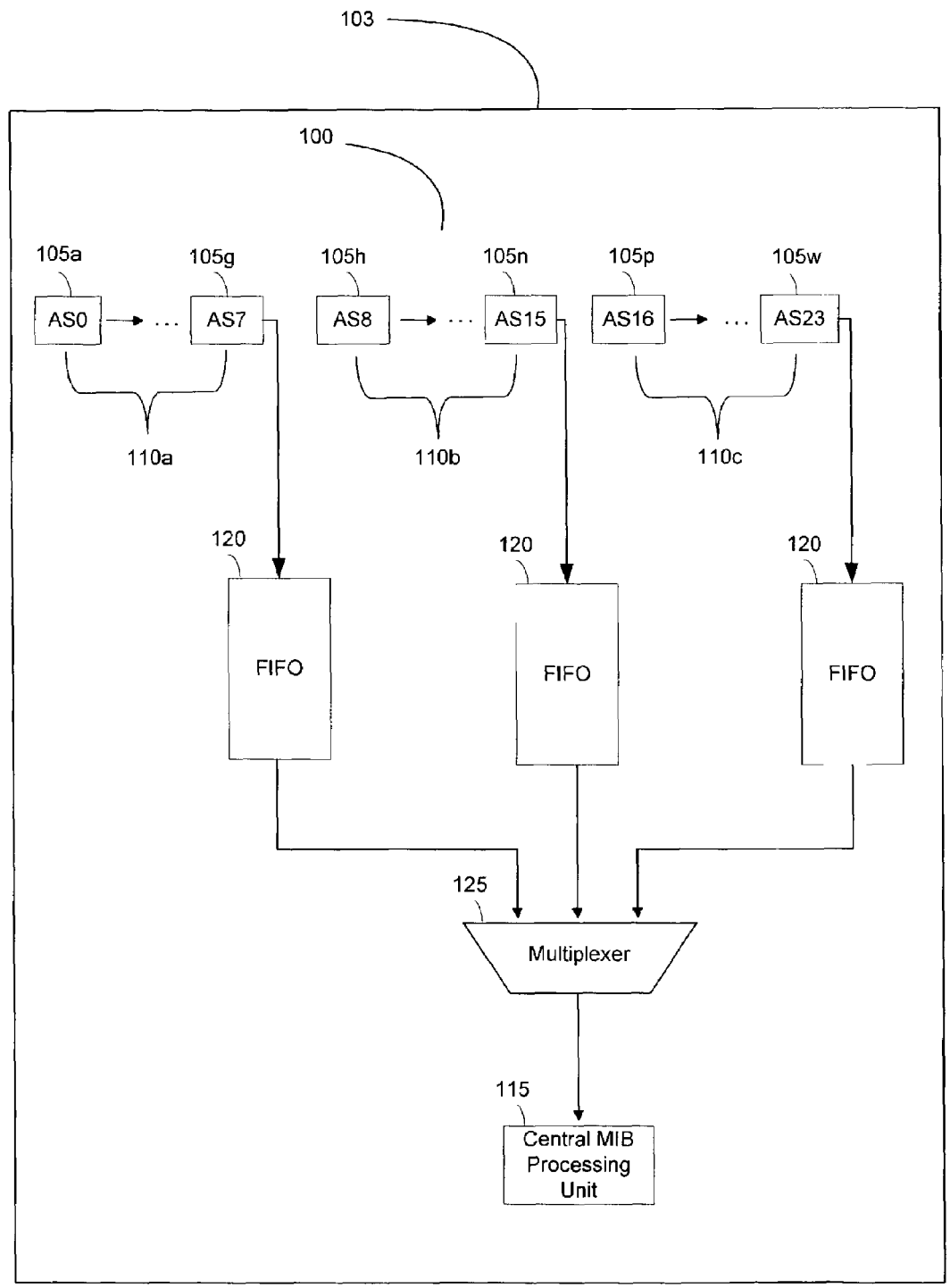
FIG. 1 is a simplified diagram of a system according to one embodiment of the invention.

The invention provides a system and a method that is capable of handling multiple MIB status events transferred from multiple channels. To avoid an overwhelming influx of data which is being simultaneously transmitted from the multiple channels (not shown) to a single MIB processing unit 115, the invention provides a segmented serial shifting bus 100 as shown in FIG. 1. The segmented serial shifting bus 100 is divided into segments 110*a*, 110*b*, 110*c*. Each assembly line corresponds to one channel of the multiple channels. The assembly lines 105 are assigned to handle the data packets transmitted from each respective channel (not shown). Contained within each assembly line 105 is the assembly line logic which includes the instructions and programs needed to handle the assembly of the data packets transferred from the respective channel. As discussed above, the segmented serial shifting bus 100 is divided into segments 110*a*, 110*b*, 110*c*, where each segment service eight assembly lines 105. For example, the twenty-four assembly lines, AS0–AS23, shown in FIG. 1, are divided into three segments, where each segment is serviced by one segment serial bus 110.

Thus, as shown in FIG. 1, the topology of each segment 110 may consist of flip flops linked together in a series with each assembly line 105 connected to the bus 100. The data transmitted from the channels (not shown) are directed to the respective assembly line 105 assigned to process the specific data. The incoming data enters the assembly lines 105. Each assembly line processes the data and generates appropriate MIB event status. This MIB event status is then latched to the serial bus structure 110. Once the MIB status data is in the serial bus 110, it is shifted in a left-to-right direction, until it reaches the end of the serial bus and exits the segment 110. Upon exiting the segments 110, the MIB data is transferred to an entry FIFO (first-in first-out) 120. The entry FIFO 120 may connect to a multiplexer 125. The multiplexer 125 receives the MIB data from the entry FIFOs and interleaves the MIB data with all MIB data being transferred to the MIB processing unit. The MIB data is then transferred to the MIB processing unit 125 to be further processed by the MIB logic.

In processing the incoming data, each assembly line 105 may generate, for example, a sixty-one-bit wide MIB status event that needs to be processed by the logic of the MIB processing unit 115. The invention provides a serial shifting bus where the status event of one assembly line is shifted in the segmented serial bus until the status data reaches the end of serial bus 110, which will shift the status event to the central MIB processing unit 125 by way of the entry FIFO 120 and the multiplexer 125. Accordingly, in this example, only sixty-one bit, instead of one thousand four hundred sixty-four bit as discussed above, are traversed through the network device, which may be a chip, a switch-on-chip or a similar device. Thus, the present invention is capable of mitigating the routing congestion entering the MIB processing unit 125. In addition, since the status event needs to be updated every eight clock cycles, according to this example, the invention includes an algorithm which is capable of breaking the serial shifting bus into three segments 110*a*, 110*b*, 110*c* with a sixteen entry deep FIFO attached at the end of each segment so that the number of assembly lines assigned to each segment corresponds to the completion of the cycle time. The algorithm may be implemented by a central processing unit (not shown). Thus, one feature of the invention ensures that the process rate of the segments is just as fast as the traffic rate of the incoming data. Namely, since the status event can be updated as fast as eight cycles, the algorithm divides the serial shifting bus into segments each servicing eight assembly lines. Thus, the system determines the cycle time required to process the data transferred from the multiple channel. Based upon the cycle time, the system then divides the number of multiple channels by the cycle time to determine the number of segments. Then, the system assigns the number of assembly lines to each segment. Thus, it takes the network device 103 eight cycles in order to process and shift out the status event from all the assembly lines before the segment receives the next incoming status events. Accordingly, each segment is assigned to eight assembly lines to ensure that the current data is processed before the receipt of the next set of incoming data.

Furthermore, at cycle zero, the network device 103 will latch the status of the event from each assembly line unto the serial bus and begin the first shift. Thereafter, the network device 103 will have seven more shift using cycle 1–7 to transfer the current status event from each segment 110 to the entry FIFO 120. Since the network device 103 employs eight cycles in order to shift out all the status events, no status will be overwritten by the set of next incoming status events. At cycle zero, not all assembly lines will have a status event to latch, so during the shifting process, data may only be written to the FIFO if a valid status event is shifted out of the serial bus segment 110.

Thus, the invention provides a shifting apparatus and method, where every assembly line latches its MIB status to the serial bus 110 (valid or invalid) at cycle zero. Serial bus 110 then uses the remaining 7 cycles to shift the MIB status to the FIFO. At the end of the serial bus which connects to the FIFO, only the valid MIB status data will be written into the FIFO. This feature allows the invention to use the least amount of logic while providing equality among all the assembly lines. Thus, the system also resolves the issue of handling two or more simultaneous generated status events. Since the invention latches all the status events at the same time (cycle 0), the invention can have numerous status events (i.e., twenty-four status events) generated simultaneously and preserve all of the status events so that they may be processed by the MIB central processing unit without any of the status events being overwritten. The reason for this configuration is so that all MIB statuses that need to be sent to the MIB processing unit simultaneously can be assigned to an assembly line. The MIB statuses can all be latched to the serial bus at cycle 0, then serially shifted to the FIFO, and then eventually shifted to the MIB processing unit. These assembly lines may not have another MIB status event until eight cycles later, by which time all the previous MIB status data has already being shifted into the FIFO.

One advantage of the invention is that it avoids the routing congestion and the duplication of MIB processing logic, which has plagued conventional multiple channel devices. With the use of the shifting algorithm and an intermediate FIFO to buffer the burstiness of the traffic via statistical multiplexing, the data structure of the invention can be used for MIB status gathering in an efficient manner.

Figure 3A:
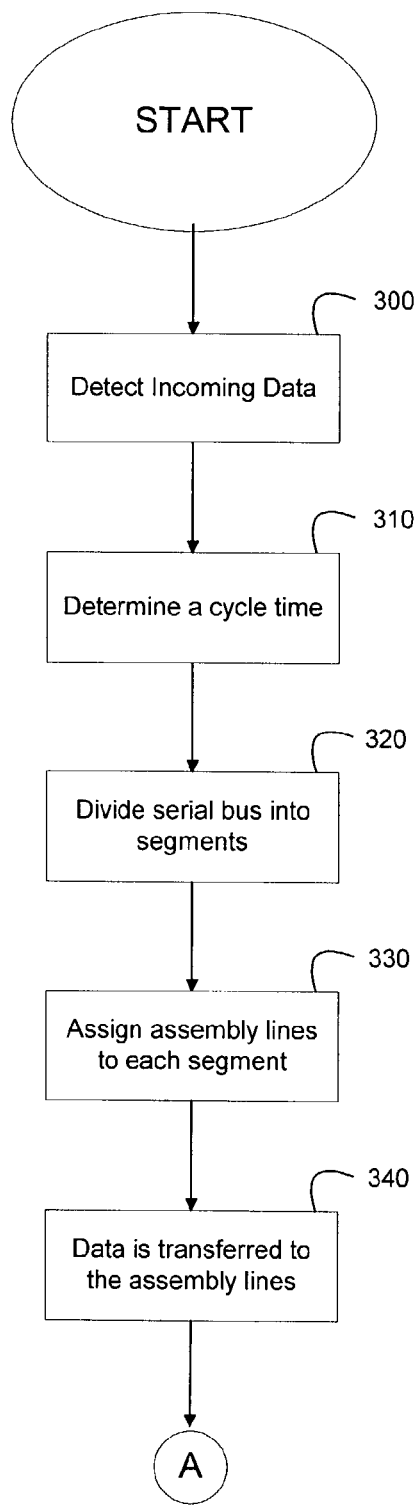
FIG. 3 is a flow chart illustrating one example of the method according to the invention.
Figure 3B:
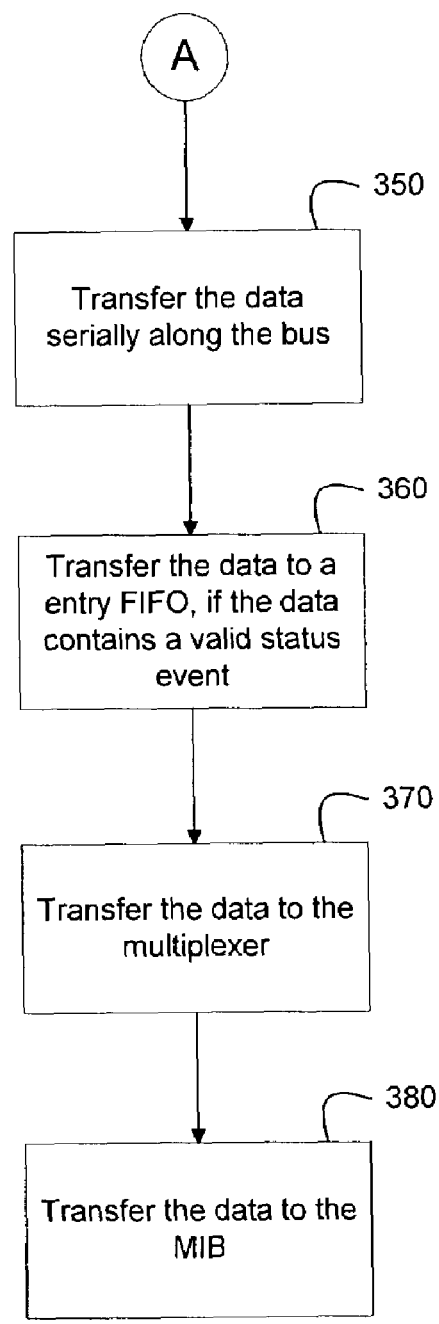

FIGS. 3A and 3B illustrate how the network device may handle data transferred in a channelized system. In step 300, the system detects a set of incoming data being transmitted into the network from multiple channels. The incoming data will generate MIB status event information. In step 310, the system determines the cycle time needed to process the incoming data. Based upon the calculated cycle time, in step 320, the system divides a serial shifting bus into a plurality of segments based upon the cycle time and the number of multiple channels. Namely, if it takes eight cycles to process the incoming data which is being transmitted along twenty-four channels, the system will divide the number of channels by the cycle time to determine the number of segments. In step 330, the system will assign assembly lines to each segments. Each assembly line is assigned to receive data from a respective channel. In step 340, the data is transferred from the channels to the respective assembly lines. The data is processed and assembled at each assembly line. Then, in step 350, each assembly line latches the generated MIB status data to the appropriate serial bus segment and the MIB status data is then shifted serially along the bus until it reaches the end. At the end of the serial bus segment, the system will transfer the MIB status data to an entry FIFO in step 360 if it is a valid MIB status event. The data will be transferred from the entry FIFO to a multiplexer in step 370. The multiplexer will interleaved the data with other incoming data. The invention may include an algorithm in order to pick the data from the FIFO that is most full, so as to avoid FIFO overflow. The FIFO count may be used as the priority indicator. The invention may be programmed so that the multiplexer always service the FIFO with highest number of status entries. Then the data, in step 380, will be transferred from the multiplexer to a MIB processing unit.

Figure 2:
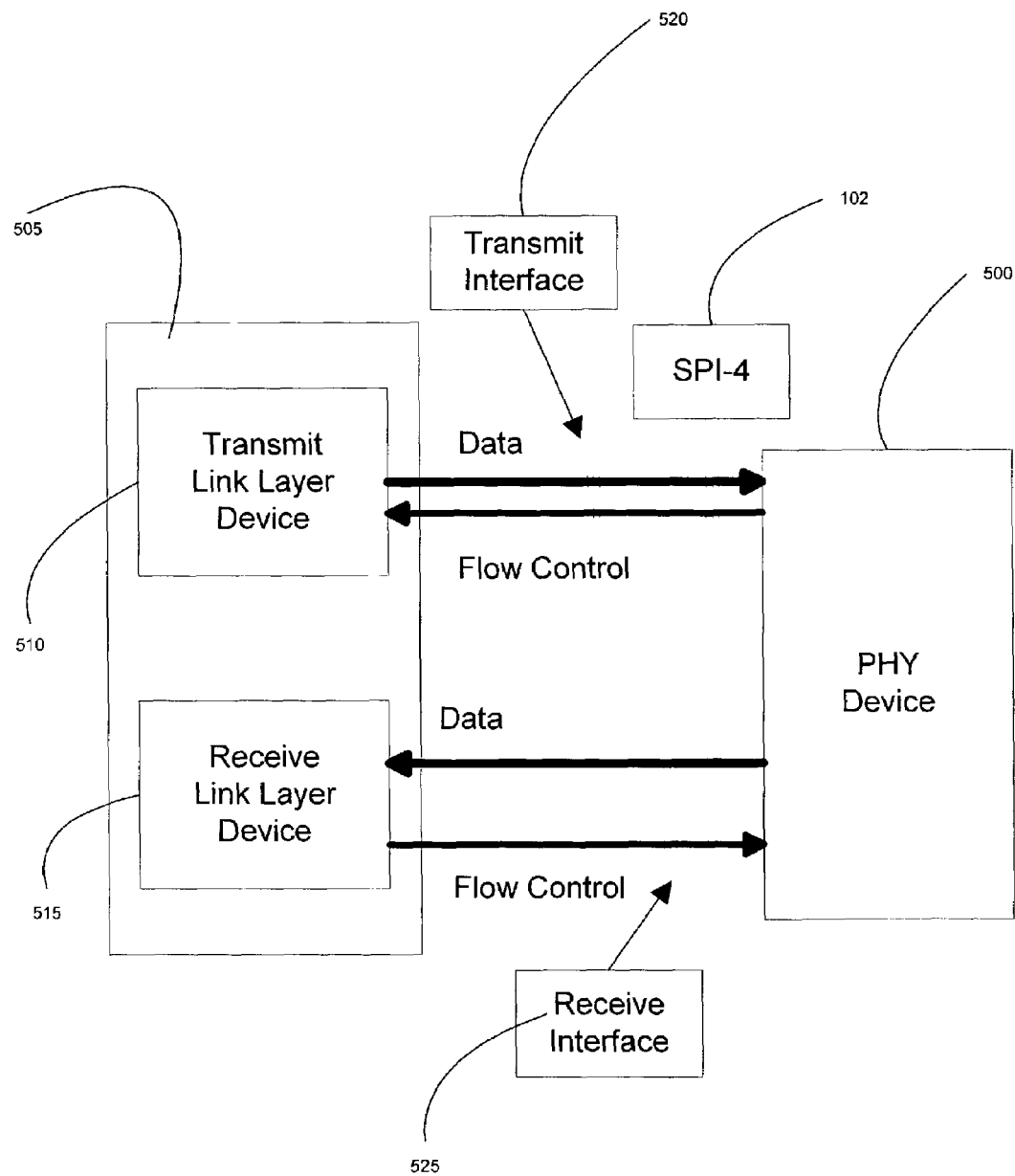
FIG. 2 depicts the SPI-4 interface.

The network device 103 may be employed to connect to a system, such as the System Packet Interface Level 4 (SPI-4) Phase 2 interface. As shown in FIG. 2, the SPI-4 102 may serve as an interface for packet and cell transfer between a physical layer device 500 and a link layer device 505, for aggregate bandwidths of OC-192 ATM and Packet over Synchronous Optical Network (SONET)/synchronous digital hierarchy (SDH) (POS), as well as 10 Gigabit/sec Ethernet. SONET is the American National Standards Institute standard for synchronous data transmission on optical media. SONET is considered to be the foundation for the physical layer of the broadband ISDN (Integrated Services Digital Network). The international equivalent of SONET is the SDH. Together, these standards ensure that digital networks can interconnect internationally and that existing conventional transmission systems can take advantage of optical media through tributary attachments. The SONET includes a set of signal rate multiples for transmitting digital signals on optical fiber. The base rate of the optical carrier levels is (OC-1), which has a data rate of 51.84 Mbps. The OC-192 is a multiple of the base rate, and has a data rate of 10 Gbps (Gigabits per second).

FIG. 2 provides a further detail of the uplink port 102. Although the SPI-4 102 is the system packet interface for data transfer between the link layer 505 and the physical device 500, the SPI-4 102 may be used in other applications such as an fast internal bus interface between communication ASIC chips within a network system. In general, the link layer is the protocol layer of the OSI model that handles the moving of data in and out across a physical link in a network. The link layer device 505 may ensure that an initial connection has been set up between a source and a destination network. The link layer device 505 may include a transmit link layer device 510 having a transmit interface 520, and a receive link layer device 515 having a receive interface 525. The transmit link layer device 510 may control the transfer of the data flow and the associated control/status information from the link layer 505 to the PHY device 500. The transmit link layer device 505 may transmit the data packet or cell according to a predetermined format. The receive link layer device may control the reception of the data flow and associated control/status information from the PHY device 500 to the link layer 505. The receive link layer device 515 may handle the acknowledgments from a receiver that the data arrived successfully and ensure that the incoming data has been received successfully by analyzing the bit patterns at certain location in the packet.

The transmit interface 520 and the receive interface 525 may be configured so that FIFO status information is sent separately from the corresponding data path. By taking FIFO status information out-of-band using different paths for the reception and transmission of the data, the invention may decouple the transmit interface 520 and receive interface 525 so that each operates independently of the other. Such an arrangement may make Packet over SONET (POS)-PHY L4 suitable not only for bi-directional but also for unidirectional link layer devices.

Although the invention has been described based upon these preferred embodiments, it would be apparent to those skilled in the art that certain modifications, variations, and alternative constructions would be apparent, while remaining within the spirit and scope of the invention. In order to determine the metes and bounds of the invention, therefore, reference should be made to the appended claims.

I claim:

1. A method of handling data flow within a network, said method comprising:
   detecting a set of data entering the network;
   determining a cycle time needed to process the set of data;
   dividing a serial shifting bus into a plurality of segments, wherein the serial shifting bus is included within the network to transfer the data;
   assigning a plurality of assembly lines to each segment, wherein each of the assembly lines is connected to the serial shifting bus;
   transferring the data to the plurality of assembly lines for processing and assembly of the data;
   generating MIB status within each assembly line and latching the MIB status to the serial bus;
   shifting the data serially along the serial bus until the data reaches the end of the plurality of segments; and
   transferring the data out of the serial shifting bus to a management information base processing unit.

2. The method as recited in claim 1, wherein the data comprises status event information.

3. The method as recited in claim 2, further comprising the step of latching the data to an entry FIFO if the data comprises a valid status event.

4. The method as recited in claim 1, further comprising the step of multiplexing the data before transferring the data to the management information base processing unit.

5. The method as recited in claim 1, wherein the network comprises a channelized system.

6. The method as recited in claim 1, wherein the step of shifting and transferring are completed within the cycle time.

7. A device for handling data flow within a network, said device comprising:
- a packet detection module contained within the network is configured to detect a set of data entering the network;
- a cycle time module configured to determine a cycle time needed to process the set of incoming data, wherein the cycle time module communicates with the packet detection module;
- a division module configured to divide a serial shifting bus into a plurality of segments, wherein the serial shifting bus is included within the network to transfer the data and the division module communicates with the cycle time module;
- assignment module configured to assign a plurality of assembly lines to each segment, wherein each of the assembly lines is connected to the serial shifting bus, wherein the assignment module communicates with the division module;
- an input device configured to receive the data at the plurality of assembly lines for processing and assembly of the data;
- the assembly lines generate MIB status and latch the MIB status to the serial bus;
- the serial shifting bus serially shifting the data until the data reaches the end; and
- the end of the serial bus segment configured to transfer the data out of the serial shifting bus to a management information base processing unit included within the network.

8. The device as recited in claim 7, wherein the data comprises status event information.

9. The device as recited in claim 8, further comprising a latching module is configured to latch the data to an entry FIFO when the data is being transferred from the end of the serial bus segment if the data comprises a valid status event.

10. The device as recited in claim 7, further comprising a multiplexer configured to use FIFO count as indicator to multiplex the data before transferring the data to the management information base processing unit.

11. The device as recited in claim 7, wherein the network comprises a channelized system.

12. The device as recited in claim 7, wherein the serial shifting bus shifts the data to the end of the segment and to the management information base within the cycle time.

13. A device for handling data flow within a network, said device comprising:
- a detection means for detecting a set of data entering the network;
- a determining means for determining a cycle time needed to process the set of incoming data;
- a division means for dividing a serial shifting bus into a plurality of segments, wherein the serial shifting bus is included within the network to transfer the data;
- an assignment means for assigning a plurality of assembly lines to each segment, wherein each of the assembly lines is connected to the serial shifting bus;
- a first transferring means for transferring the data to the plurality of assembly lines for processing and assembly of the data;
- a status generation means for each assembly line to generate MIB status and latch it to serial bus;
- a shifting means for shifting the data serially along the serial shifting bus to the end of the bus segment; and
- a second transferring means for transferring the data out of the serial shifting bus to a management information base processing unit.

14. The device as recited in claim 13, wherein the incoming data comprises status event information.

15. The device as recited in claim 14, further comprising a latching means for latching the data to an entry FIFO if the data comprises a valid status event.

16. The device as recited in claim 13, further comprising a multiplexing means for multiplexing the data before transferring the data to the management information base processing unit.

17. The device as recited in claim 13, wherein the network comprises a channelized system.

* * * * *